United States Patent
Bastian et al.

(10) Patent No.: US 6,917,869 B2
(45) Date of Patent: Jul. 12, 2005

(54) METHOD OF CONTROLLING THE VEHICLE HANDLING BY MEANS OF MEASURES FOR AVOIDING AN UNDERSTEERING

(75) Inventors: Klaus Bastian, Neuhausen (DE); Jan Frank, Koeigsbach-Stein (DE); Markus Hofbauer, Rechberghausen (DE)

(73) Assignee: Dr. Ing. h.c.F. Porche AG, Stuttgart (DE)

( * ) Notice: Subject to any disclaimer, the term of this patent is extended or adjusted under 35 U.S.C. 154(b) by 0 days.

(21) Appl. No.: 10/670,745

(22) Filed: Sep. 26, 2003

(65) Prior Publication Data

US 2004/0129474 A1 Jul. 8, 2004

(30) Foreign Application Priority Data

Sep. 26, 2002 (DE) ........................................ 102 45 035

(51) Int. Cl.$^7$ ................................................ G06G 7/76
(52) U.S. Cl. ............................ 701/70; 701/41; 701/69; 701/79; 180/234
(58) Field of Search ............................. 701/41, 69, 70, 701/79, 81, 87, 89; 180/233, 234

(56) References Cited

U.S. PATENT DOCUMENTS 5,225,984 A * 7/1993 Nakayama ................... 701/36
5,262,950 A * 11/1993 Nakayama ................... 701/36

FOREIGN PATENT DOCUMENTS

| DE | 37 41 009 C2 | 6/1988 |
| DE | 38 08 786 C2 | 10/1988 |
| DE | 197 21 299 A1 | 12/1997 |
| EP | 0 460 547 A2 | 12/1991 |

* cited by examiner

Primary Examiner—Gertrude A. Jeanglaude
(74) Attorney, Agent, or Firm—Crowell & Moring LLP

(57) ABSTRACT

Method of controlling the vehicle handling of vehicles having a controllable longitudinal clutch and/or a controllable main-axle lateral lock in the case of all-wheel systems and a controllable lateral lock in the case of vehicles with a single-axle operation wherein at least the driving speed (v), the lateral acceleration ($a_q$) and the actual steering angle (LW(act)) are detected. From the filed characteristic diagram, which extends along the driving speed (v) and the lateral acceleration ($a_q$), the pertaining steering angle (LW (KF)) is determined for the respective driving speed (v) and the lateral acceleration ($a_q$) and is then compared with the actual steering angle (LW(act)). If the two steering angles deviate from one another by at least a definable amount, the lateral acceleration is adapted by changing the locking torque for a stable vehicle handling.

12 Claims, 1 Drawing Sheet

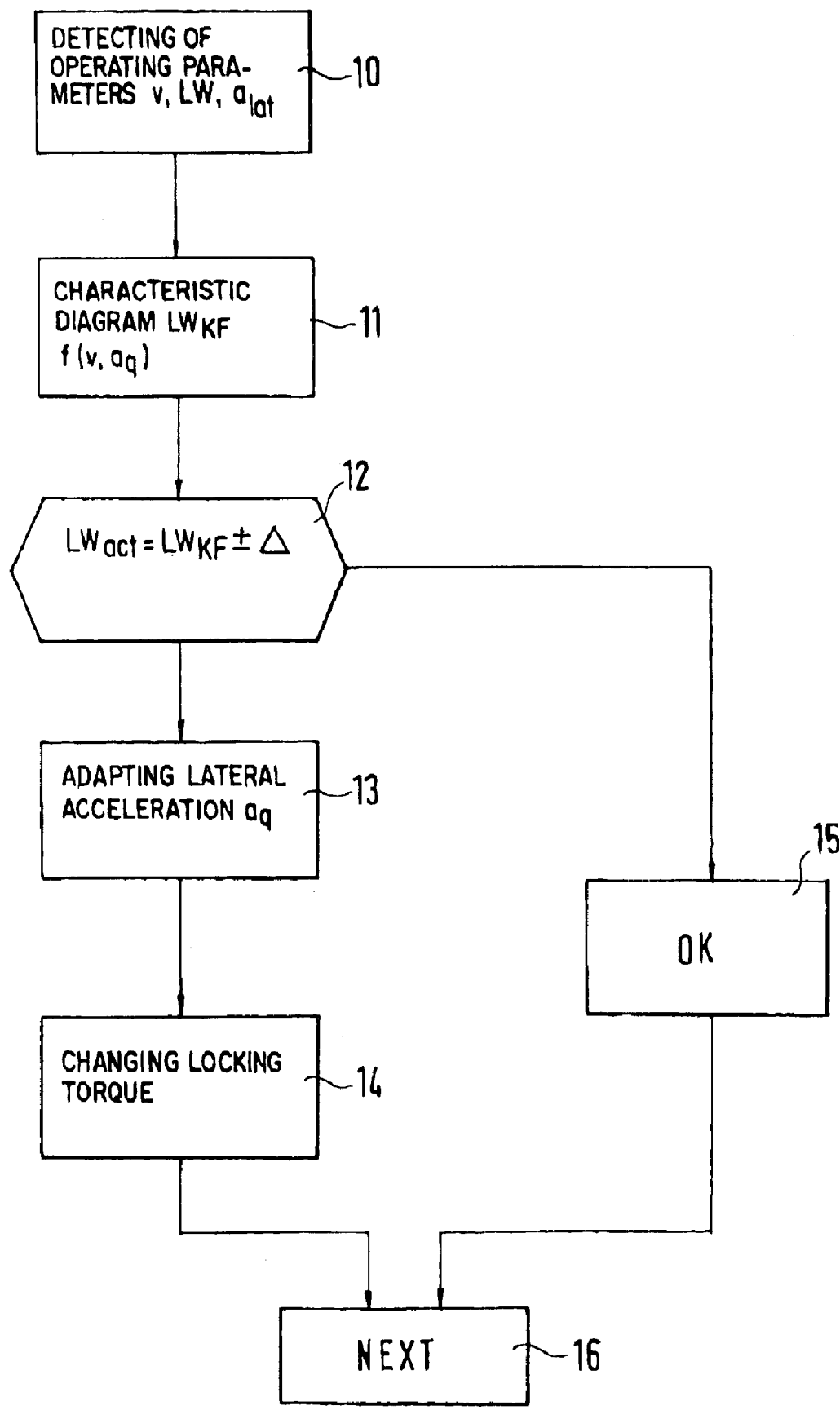

METHOD OF CONTROLLING THE VEHICLE HANDLING BY MEANS OF MEASURES FOR AVOIDING AN UNDERSTEERING

BACKGROUND AND SUMMARY OF THE INVENTION

This application claims the priority of application Ser. No. 102 45 035.8, filed Sep. 26, 2002, in Germany, the disclosure of which is expressly incorporated by reference therein.

The present invention relates to vehicles which have an all-wheel drive with a fixed torque distribution and a controllable longitudinal lock with or without a controllable main-axle lateral lock.

In the case of vehicles having a locking torque at the longitudinal and/or lateral lock, an understeering of the vehicle may occur in certain driving situations as a result of the torque distribution between the front axle and the rear axle and the coefficient-of-friction conditions at the wheels. As a result the vehicle will no longer follow the driving direction desired by the driver and will lurch by way of the front wheels.

The present invention uses a recognized correlation between the vehicle speed, the lateral acceleration and the steering angle for optimal controlling of the lateral acceleration. The method according to the invention has the advantage that, in the event of an understeering, the vehicle handling can be influenced by a change of the torque distribution between the axles and/or the reduction of the locking torque at the lateral lock. It is particularly advantageous that, through the use of the lateral acceleration and the driving speed in a three-dimensional characteristic diagram, an envelope curve for the pertaining steering angles can be stored. As a result, the corresponding steering angle at which the vehicle allows a neutral vehicle handling can be determined for any driving situation. The present invention therefore has the advantage that, when the steering angle deviates from the envelope curve, an unstable driving condition is detected, in which case an understeering of the vehicle is recognized when the actual steering angle is defined to be greater than that of the envelope curve. If the steering angle is within the envelope curve, a normal driving situation exists and the vehicle follows the driving direction desired by the driver. When determining the driving situation, a plurality of parameters, such as the yaw angle, the yaw velocity, the yaw acceleration, the driving speed or also replacement models for the rotational wheel speeds can be included. Finally, quantities which influence the vehicle handling determined in the application, may be evaluated and may be filed as information in the control unit of the vehicle.

Other objects, advantages and novel features of the present invention will become apparent from the following detailed description of the invention when considered in conjunction with the accompanying drawings.

BRIEF DESCRIPTION OF THE DRAWING

An embodiment of the control according to the invention is illustrated in the FIGURE and will be explained in detail in the following.

DETAILED DESCRIPTION OF THE PREFERRED EMBODIMENT

The FIGURE shows a flow chart for implementing the method of detecting an oversteering of the vehicle and the steps for controlling this unstable vehicle handling.

The method according to the invention for controlling the longitudinal and/or lateral lock of a vehicle is illustrated as a basic diagram. Details which are not significant with respect to the basic idea of the invention will not be extensively discussed.

According to the present method, various operating parameters, such as the vehicle speed v, the lateral acceleration $a_q$ and the steering angle LW are first detected in a first operating step 10. Normally, these values already exist in the vehicle and are transmitted, for example, by way of a CAN bus to the individual control units. No additional sensors or analyzing units are required for the analysis and implementation. Only the required values have to be read out and made available for the further processing. Subsequently, the pertaining characteristic-diagram steering angle (LW(KF) for the driving speed v and the lateral acceleration $a_q$ is read in an operating step 11 out of a filed characteristic diagram which extends along the vehicle speed v and the lateral acceleration $a_q$. The characteristic diagram was, for example, determined already in the application and stored in the control unit. In query 12, the actual LW(akt) and the characteristic-diagram steering angle LW(KF) are now compared with one another. The two values may deviate from one another by a definable deviation Δ without the detection of an action requirement for an intervention for changing the lateral acceleration. This means that, if the actual steering angle LW(akt) in this permissible range is LW(akt)=LW(KF)+Δ, the yes output of this query 12 leads to a program step 15, in which a proper vehicle handling is detected and no additional interventions are carried out in the driving situation. However, if a correspondingly large deviation of the steering angles was detected, the no output of query 12 leads to a working step 13 in which an oversteering is now detected and thus a required change of the lateral acceleration. This changing of the lateral acceleration is implemented in the subsequent working step 14 by way of a corresponding controlling of the longitudinal and/or lateral lock. The change of the lateral acceleration is implemented by an increase of the lateral control. This increase takes place by changing the distributor ratio and thus by the corresponding controlling of the locks. As a result, a correction of the steering angle is also required so that the driver is also integrated into the control loop. By means of the correction of the lateral acceleration and/or the steering angle, the vehicle is stabilized in the defined neutral path curve. The steps for the reduction of the oversteering by changing the longitudinal and/or lateral lock may be determined in this case in a variable manner. The speed of the control operation may, for example, be a function of additional demands on the vehicle. Here, for example, the actual condition of the road may also be taken into account. After an adaptation of the vehicle handling has taken place, this is detected in step 16, and new values can now be detected for the control according to the invention.

As mentioned above, the values for the envelope curve were theoretically predetermined and were adapted during the driving test to the respective vehicle type. A possible neutral path curve for the steering angle is obtained from the function LW=f ($a_q$, $V_{veh}$).

In principle, this explained strategy may be used for correcting an understeering as well as an oversteering. It should also be noted that, as a result of the steering angle which is generally not constant in the driving operation, the driver also represents a part of the control loop. A reduction of the front-axle fraction and/or the reduction of the locking torque of a lateral lock also ends the lateral control capacity of the front axle so that the extent of the understeering is reduced and ideally eliminated.

This control strategy can be used in the case of a four-wheel drive with a longitudinal clutch, in the case of a four-wheel drive with a fixed distribution of the controllable longitudinal lock and the controllable rear-axle lateral lock, and in the case of a two-wheel drive with a controllable lateral lock.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of controlling handling of one of an all-wheel drive vehicle having at least one of a controllable longitudinal clutch and a controllable main-axle lateral lock and a single axle drive vehicle having a controllable lateral lock, said method comprising the steps of:

detecting at least the driving speed (v), the lateral acceleration ($a_q$) and the actual steering angle (LW(akt));

providing a stored a filed characteristic diagram, which includes the driving speed (v) and the lateral acceleration ($a_q$) said diagram supplying a characteristic-diagram steering angle (LW(KF)) pertaining to the driving speed (v) and the lateral acceleration ($a_q$); and changing the lateral acceleration ($a_q$) when a definable deviation ($\Delta$) of the actual steering angle (LW(act)) from the characteristic-diagram steering angle (LW(KF)) is exceeded.

2. The method according to claim 1, wherein a changing lateral acceleration takes place by way of a change of said at least one of said longitudinal and said lateral lock.

3. The method according to claim 2, wherein a change of control of said at least one of said longitudinal clutch and said lateral lock takes place in variable steps.

4. The method according to claim 1 wherein, a lateral control capacity changes by way of a reduction of locking torque, to thereby reduce understeering.

5. The method according claim 2 wherein, a lateral control capacity changes by way of a reduction of locking torque, to thereby reduce understeering.

6. The method according to claim 3 wherein, a lateral control capacity changes by way of a reduction of locking torque, to thereby reduce understeering.

7. A method of controlling handling of a vehicle, comprising the steps of:

detecting at least a driving speed, a lateral acceleration and an actual steering angle;

deriving a predicted steering angle from said detected driving speed and said lateral acceleration; and modifying said detected lateral acceleration when a deviation between said actual steering angle and said predicted steering angle exceeds a predetermined value, wherein said vehicle is one of an all-wheel drive vehicle having at least one of a controllable clutch and a controllable main-axle, and a single axle drive vehicle having a controllable lateral lock.

8. The method according to claim 7, wherein a changing lateral acceleration takes place by way of a change of said at least one of said longitudinal and said lateral lock.

9. The method according to claim 7, wherein change of control of said at least one of said longitudinal, clutch a lateral lock takes place in variable steps.

10. The method according to claim 7, wherein a lateral control capacity changes by way of a reduction of locking torque, to thereby reduce understeering.

11. The method according to claim 8, wherein a lateral control capacity changes by way of a reduction of locking torque, to thereby reduce understeering.

12. The method according to claim 9, wherein a lateral control capacity changes by way of a reduction of locking torque, to thereby reduce understeering.

* * * * *